March 30, 1954  M. W. HUBER  2,673,624
LOCKING MEANS
Filed Dec. 31, 1952

INVENTOR
Matthew W. Huber

BY Dodge and Sons

ATTORNEYS

Patented Mar. 30, 1954

2,673,624

UNITED STATES PATENT OFFICE 2,673,624

LOCKING MEANS

Matthew W. Huber, Watertown, N. Y., assignor to The New York Air Brake Company, a corporation of New Jersey Application December 31, 1952, Serial No. 328,981

2 Claims. (Cl. 188—67)

This invention relates to hydraulically actuated locking means for an axially movable member. Specifically it relates to a lock of the canting ring type in which the canting movement of the ring is caused by the actuation of a hydraulic motor. This application is a continuation-in-part of applicant's application Serial No. 254,939, filed November 5, 1951, now abandoned.

The invention is intended primarily for use with the brake motors in a hydraulic brake system, but other uses are contemplated. Hydraulic brakes have not replaced mechanical brakes in applications where it is desirable to set the brakes and maintain them set for extended periods of time. The reason for this is that leakage in the hydraulic system results in the brakes being partially or completely released. According to the present invention, a hydraulically actuated mechanical lock is provided so that a hydraulic motor may be locked in position by hydraulic actuation of the locking means and maintained locked even though the pressure may be dissipated throughout the system.

The locking means is of the familiar canting ring type. The ring is mounted so that it encircles the piston of the hydraulic motor and is normally maintained with its axis parallel with the axis of the piston of the hydraulic motor. The ring has an inner radius which corresponds to the radius of the member which it encircles. An axis is afforded about which the ring may be canted. A secondary hydraulic motor is provided which is effective, when actuated, to cant the encircling ring thereby causing it to cramp the encircled member and prevent motion thereof in one direction. A lock made according to present invention has two main advantages over a simple cant ring lock. It can be applied or released by the manipulation of a valve which may be located at a point remote to the lock. Secondly, it is not necessary for canting movement of the ring that the encircled member be moved.

While the locking member shown in the drawing is circular, it could take various forms depending upon the contour of the member to be locked in place. The word "ring" as used in the specification and the appended claims is used in a generic sense as defining an encircling locking member of this general type.

The preferred embodiment of the invention will be described having reference to the accompanying drawing, in which.

Figure 1:
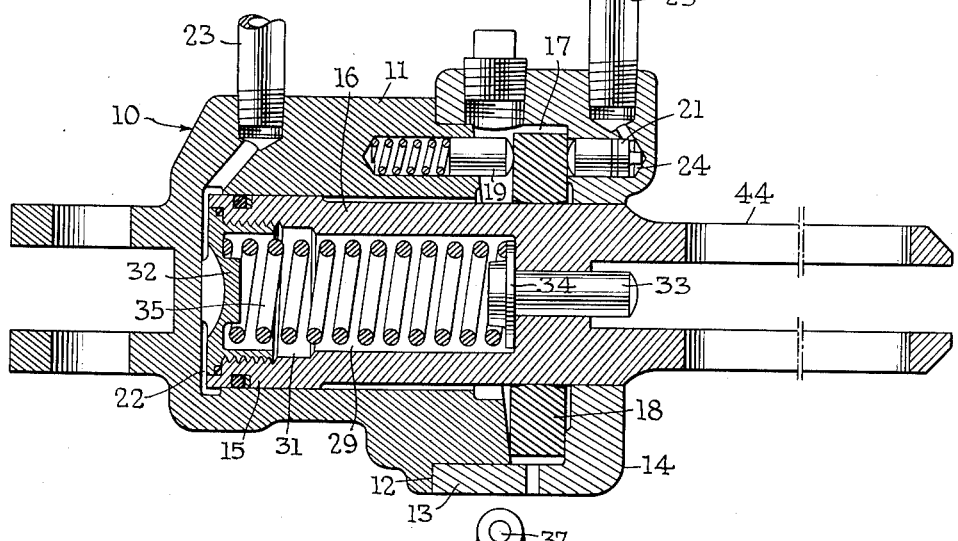
Figure 1 is an axial section of a motor embodying the invention.

The hydraulic motor 10 comprises a body 11 having an annular outer shoulder 12. Bearing against this shoulder 12 is the flange portion 13 of a centrally apertured cap 14. A piston 15 is reciprocable in a cylindrical bore in the body 11 and has a stem 16 which extends outward through the cap 14. Defined between the opposed surfaces of the body 11 and the cap 14 is a chamber 17 having the form of a truncated right circular cylinder. Mounted within the chamber 17 is a ring 18 which encircles the stem 16. The axial dimension of ring 18 corresponds to the length of the shortest element of chamber 17. A spring biased member 19 reacts between the body 11 and ring 18 and urges the ring into contact with the plane inner surface of the cap 14 which surface is normal to the axis of the piston stem 16. This plane inner surface serves as a stop for the ring 18 in its unlocked position. The member 19 is located in the region where the axial dimension of the chamber 17 is largest.

The cap 14 is provided with a cylindrical bore in which is mounted a motor plunger 21. Plunger 21 reacts on the outer side of the ring 18 and when actuated cants the ring 18 against the spring bias of the member 19.

The working chamber 22 of the motor 10 may be charged with pressure fluid through the line 23 which extends from a suitable pressure generator, not shown. The working space 24 defined by the motor plunger 21 and the bore in cap 14 receives pressure fluid through a line 25. The admission and release of pressure fluid from the line 25 is controlled by a suitable valve 26 which is schematically shown as a rotary plug type of valve. The line 27 is a release line, and the line 28 serves as a pressure supply line. The line 28 may be connected to any suitable source of pressure fluid which may be the pressure generator which supplies fluid to brake motor working space 22.

As shown in Figure 1, the piston 15 has an axial bore 29 having an enlarged portion 31. The outer end of portion 31 is closed by screw plug 32. A flanged stop member 33 extends outward from the bore 29, the flange seating against the shoulder 34. A compression spring 35 reacts between the plug 32 and the stop 33 and biases the latter outward.

Figure 2:
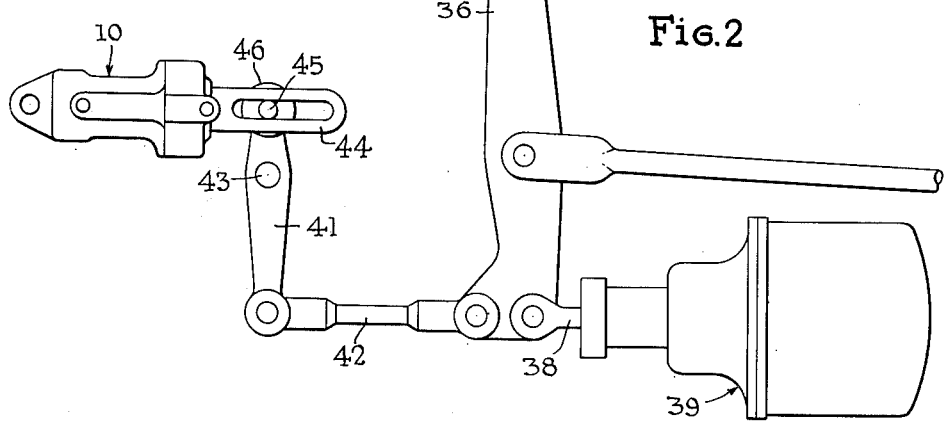
Figure 2 is a diagrammatic showing of the motor illustrated in Figure 1 applied to the rigging of a railway car.

In Figure 2 the motor 10 is shown applied to the conventional brake rigging of a railway car. The brake rigging comprises a lever 36 having fixed pivot at 37. The opposite end of lever 36 is attached to the piston rod 38 of a conventional pneumatic brake cylinder 39. Also attached to this end of the lever 38 is a linkage comprising hingedly inter-connected levers 41 and 42. Lever 41 has a fixed pivot at 43. The piston rod 15 has a slotted clevis 44 which receives a pin 45 carried by the lever 41. A generally circular boss 46 on lever 41 encircles the pin 45 and is received between the legs of the clevis 44. It will be apparent that the brakes may be selectively applied and released by either motor 10 or brake cylinder 39.

The operation of the device will be fully understood from the following description. When pressure fluid is supplied to the line 23 the piston 15 is moved outward, thus applying the brakes. When the brakes are applied the valve 26 is turned so that pressure fluid is admitted to the working space 24 behind the motor plunger 21 which is thus moved outward. This motion of the plunger 21 causes the ring to cant and thereby to cramp the piston stem 16. It will be noted that the inner axial surface of the ring 18 is slightly curved, so that scarring of the stem 16 is minimized. The frictional engagement between the ring 18 and the stem 16 may be improved by serrating the mating surfaces, but this is not necessary.

When the brakes are applied and locked, leakage of the pressure fluid from the motors will not release the brakes because the ring 18 will not free the stem 16. This is true even if the pressure in line 25 is dissipated. If pressure in lines 25 and 23 is dissipated the reaction forces the brakes and the piston 15 tend to urge the piston 15 axially inward of the body 11. Once the ring 15 has been engaged, any tendency of the piston 15 to move inward only increases the cramping action of the ring 18.

It should be noticed that the ring 18 is moved into locking position without the necessity of moving the piston 15. This means that the brake motor may be locked with the brakes fully set.

The brakes may be released by again applying pressure to line 23 and releasing pressure from line 25. Under these conditions the ring 18 is returned to its illustrated position by the member 19 and the piston is then free to move inward when the pressure in line 23 is released. The valve 26 is preferably located close to the pressure generating means used to apply and release the brakes, so that the brakes can be applied, locked and released from a single point.

If it is assumed that the brakes are applied and locked by the motor 10 and that the pressure has been dissipated from lines 23 and 25, it will be seen that the cant ring 18 is maintained in locked position by the reaction force exerted by lever 41 of the brake rigging. If under these conditions the brake cylinder 39 is actuated the canting ring 18 would be unlocked if the force exerted by the cylinder 34 were sufficient to apply the brakes with greater force than that applied by motor 10. This undesired unlocking is prevented by the spring biased stop 33 which reacts against the boss 46 to maintain a reaction force on the motor piston even though the brake rigging may move a short distance under the action of the brake cylinder 34.

It will be apparent that the valve 26 could be used to control the flow of pressure fluid to a plurality of motors and such use is contemplated.

The preferred embodiment of the invention has been described in considerable detail, but no limitation to this embodiment is implied other than may be expressed in the appended claims.

What is claimed is:

1. Locking means for single-acting fluid pressure motors comprising in combination a motor housing having a cylinder bore therein; a motor piston reciprocable in said cylinder bore and defining therein a working space; a ring encircling said piston; means affording an axis about which said ring may be canted; a stop; means biasing said ring against said stop, the axis of said ring being parallel with the axis of said piston when said ring engages said stop; and fluid pressure motor means effective when actuated to cant said ring about said axis toward said working space and away from said stop whereby said ring cramps against said piston and holds it against retrograde movement.

2. Locking means for single-acting fluid pressure motors comprising in combination a motor housing having a cylinder bore therein; a motor piston reciprocable in said cylinder bore and defining therein a working space; a ring encircling said piston; means affording an axis about which said ring may be canted; a stop; means biasing said ring against said stop, the axis of said ring being parallel with the axis of said piston when said ring engages said stop; fluid pressure motor means effective when actuated to cant said ring about said axis toward said working space and away from stop whereby said ring cramps against said piston and holds it against retrograde movement; and a spring biased element arranged to react between said piston and the means reacted upon by said piston.

MATTHEW W. HUBER.

References Cited in the file of this patent

UNITED STATES PATENTS

| Number | Name | Date |
|---|---|---|
| 722,894 | Potter | Mar. 17, 1903 |
| 836,303 | Christensen | Nov. 20, 1906 |
| 1,362,990 | Gilman | Dec. 21, 1920 |
| 2,463,966 | Hauschild | Mar. 8, 1949 |

FOREIGN PATENTS

| Number | Country | Date |
|---|---|---|
| 608,704 | Great Britain | 1948 |